US006797196B2

(12) United States Patent
Danjo

(10) Patent No.: US 6,797,196 B2
(45) Date of Patent: Sep. 28, 2004

(54) BLEACHING FORMULATION

(75) Inventor: Hiroshi Danjo, Wakayama (JP)

(73) Assignee: Kao Corporation, Tokyo (JP)

( * ) Notice: Subject to any disclaimer, the term of this patent is extended or adjusted under 35 U.S.C. 154(b) by 327 days.

(21) Appl. No.: 10/032,475

(22) Filed: Jan. 2, 2002

(65) Prior Publication Data

US 2002/0134965 A1 Sep. 26, 2002

(30) Foreign Application Priority Data

Jan. 10, 2001 (JP) ....................................... P. 2001-2451

(51) Int. Cl.$^7$ ......................... C01B 15/01; C01B 15/04; C01B 15/10; C11D 3/39; C11D 7/38

(52) U.S. Cl. ............................ 252/186.33; 252/186.38; 252/186.39; 510/311; 510/312; 510/313; 510/314

(58) Field of Search ....................... 252/186.33, 186.38, 252/186.39; 510/311, 312, 313, 314

(56) References Cited

U.S. PATENT DOCUMENTS 5,853,428 A * 12/1998 Collins et al. ................. 8/107
5,876,625 A * 3/1999 Collins et al. ......... 252/186.33
5,969,171 A * 10/1999 Nestler ........................ 556/45
6,011,152 A 1/2000 Gordon-Wylie et al. .... 540/474
6,054,580 A * 4/2000 Collins et al. .............. 540/460
6,099,586 A * 8/2000 Collins et al. .................. 8/111
6,136,223 A * 10/2000 Collins et al. ......... 252/186.33
6,153,576 A * 11/2000 Blum et al. ................. 510/311
6,241,779 B1 * 6/2001 Collins et al. .................. 8/111
6,649,582 B1 * 11/2003 Banse et al. ................ 510/376
6,653,270 B2 * 11/2003 LaBeque .................... 510/311

FOREIGN PATENT DOCUMENTS

WO 98/03263 1/1998
WO 98/03625 1/1998
WO WO 98/03625 * 1/1998
WO WO 98/03626 * 1/1998
WO 98/03626 1/1998
WO 98/58735 12/1998
WO 99/58634 11/1999
WO WO 99/58634 * 11/1999
WO 99/64156 12/1999

* cited by examiner

*Primary Examiner*—Joseph D. Anthony
(74) *Attorney, Agent, or Firm*—Birch, Stewart, Kolasch & Birch, LLP

(57) ABSTRACT

A bleaching formulation comprising (a) a peroxy bleaching agent selected from hydrogen peroxide and a peroxide or an organic peracid capable of generating hydrogen peroxide in an aqueous solution, (b) an anionic bleaching catalyst containing a metal, and (c) a cationic compound, and a bleaching method comprising using the bleaching formulation wherein pretreatment with component (c) precedes treatment with components (a) and (b), or components (a), (b), and (c) are used simultaneously.

7 Claims, No Drawings

BLEACHING FORMULATION

FIELD OF THE INVENTION

This invention relates to a bleaching formulation suitable for removal of stains or dirt from clothes or rigid surfaces such as tableware, glassware, plastics, and artificial teeth, hair bleaching, wood pulp bleaching, and the like.

BACKGROUND OF THE INVENTION

It is a well-known technique to use peroxy bleaching agents, such as hydrogen peroxide, in laundering. Peroxy bleaching agents are used at high temperature and effective for removal of stains of tea, coffee, wine and fruit. Because the peroxy bleaching agents drastically reduce their effect at 60° C. or lower, a combined use of transition metal complexes as an activator catalyzing peroxide oxidation reactions has been studied. For example, JP-B-7-65074 (the term "JP-B" as used herein means an "examined Japanese patent publication") discloses a manganese complex having a cyclic polyamine as a ligand; JP-W-11-507689 a cobalt ammine complex; JP-A-8-67687 (the term "JP-A" as used herein means an "unexamined published Japanese patent application") and JP-W-11-515049 (the term "JP-W" as used herein means an unexamined published international patent application) a manganese or cobalt Schiff base derivative complex; WO95/34628 and WO97/48710 an iron complex having a pyridylmethylamine derivative as a ligand; and WO98/03625 an iron complex with a tetraamide derivative ligand. However, these proposals have their several disadvantages. For example, some combinations fail to develop bleaching performance, and some combinations exhibit bleaching performance but damage fiber or bleach out even dyes. Some complexes are labile, and some other complexes are costly.

In order for a bleaching composition containing a transition metal complex as an activator to develop bleaching activity, it is required that the complex itself be stable in an aqueous bleaching solution and capable of reacting with a source of hydrogen peroxide to produce a kind of oxidation active species which reacts with stains. Another factor which also governs the bleaching performance of the bleaching composition is whether the complex has easy access to objects to be bleached (fiber (cloth) and rigid surfaces, e.g., glassware and earthenware). Seeing that the objects to be bleached and most of their stains are negatively charged (anionic), and peroxides such as hydrogen peroxide are also anionic, it is advantageous for the activator itself be cationic in view of a favorable electrostatic interaction as suggested in JP-A-1-97267. In fact, the manganese complex of JP-B-7-65074 and the cobalt complex of JP-W-11-507689 are cationic so as to have good access to fiber (cloth). Nonetheless the bleaching compositions containing these complexes cannot get rid of the above-described disadvantages. On the other hand, the iron complex of WO98/03625, being anionic, is not considered to have easy access to objects to be bleached and to develop expected activity.

SUMMARY OF THE INVENTION

An object of the present invention is to provide a bleaching composition containing an anionic activator (catalyst) in which a peroxy bleaching agent exhibits improved performance even in low temperatures.

The present inventors have found that a combination of a cationic compound and an anionic bleaching activator provides a bleaching formulation exhibiting markedly improved bleaching performance.

The present invention provides a bleaching formulation comprising (a) a peroxy bleaching agent selected from hydrogen peroxide and a peroxide or an organic peracid capable of generating hydrogen peroxide in an aqueous solution, (b) an anionic bleaching activator containing a metal, and (c) a cationic compound.

The invention also provides a method of bleaching an object, which comprises using the above-described bleaching formulation according to any of procedures (i) to (iii):

(i) The object is bleached with a mixture of components (a), (b) and (c).

(ii) The object is pre-treated with a composition containing component (c) and then bleached with a composition containing components (a) and (b).

(iii) The object is pre-treated with a composition containing components (b) and (c) and then bleached with a composition containing component (a).

DETAILED DESCRIPTION OF THE INVENTION

Component (a) which can be used in the present invention is preferably selected from hydrogen peroxide and a peroxide capable of generating hydrogen peroxide in an aqueous solution. Such peroxides include sodium percarbonate, a sodium tripolyphosphate/hydrogen peroxide adduct, a sodium pyrophosphate/hydrogen peroxide adduct, a urea/hydrogen peroxide adduct, sodium perborate monohydrate, sodium perborate tetrahydrate, sodium peroxide, and calcium peroxide, with sodium percarbonate, sodium perborate monohydrate and sodium perborate tetrahydrate being preferred.

The anionic metal-containing bleaching activator as component (b) includes (b-1) a complex having anionic ligands (total number of negative charges: m) coordinated to at least one cationic center metal (total number of positive charges: n) to have an anionic property as a whole, i.e., $n-m<0$. The term "anionic ligand" means a ligand having a negative charge and includes a ligand of which the atom coordinating to the center metal is anionic and a ligand carrying an anionic functional group in its non-coordinating site. The complex may be mononuclear, having a single center metals, or polynuclear, having two or more center metals. The anionic metal-containing bleaching activator (b) also includes (b-2) a metal oxide having a center metal (number of positive charges: p) oxidized with oxygen atoms (total number of charges: q) to have an anionic property as a whole, i.e., $p-q<0$.

More specifically a complex composed of a center metal having +3 charges and anionic ligands totally having −4 charges has a −1 charge as a whole to be anionic. Similarly, a complex composed of a center metal having +2 charges and anionic ligands totally having −4 charges has −2 charges as a whole to be anionic.

Such anionic metal-containing bleaching activators include anionic complexes such as a tetraamide complex represented by formula (I), tetra(sulfonated phenyl) porphyrin Fe complex represented by formula (III), and tetrasulfonated phthalocyanine Fe complex represented by formula (IV):

(I)

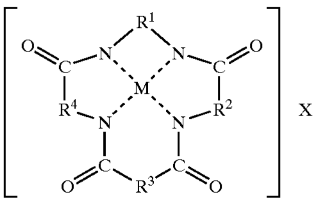

wherein $R^1$ represents a straight-chain alkylene or alkenylene group having 2 to 8 carbon atoms, a cycloalkylene or cycloalkenylene group having 3 to 8 carbon atoms or a phenylene group; $R^2$, $R^3$ and $R^4$, which may be the same or different, each represent a methylene group, a straight-chain alkylene or alkenylene group having 2 to 8 carbon atoms, a cycloalkylene or cycloalkenylene group having 3 to 8 carbon atoms or aphenylene group; $R^1$, $R^2$, $R^3$ and $R^4$ may each have a substituent(s) selected from an alkyl, alkenyl, alkynyl, alkoxy or halogenated alkyl group having up to 8 carbon atoms, a cycloalkyl or cycloalkenyl group having 3 to 8 carbon atoms, an aryl group, an aryl group having a straight-chain alkyl group having 1 to 18 carbon atoms, a hydroxyl group, a phenoxy group, a halogen atom, an amino group, a sulfuric acid radical, a sulfo group, a nitro group, and a carboxyl group; M represents a metal selected from transition metals having a I, II, III, IV, V, VI, VII or VIII-valent oxidized state; and X represents a counter ion in equilibrium with the compound's charges on a stoichiometric basis.

(III)

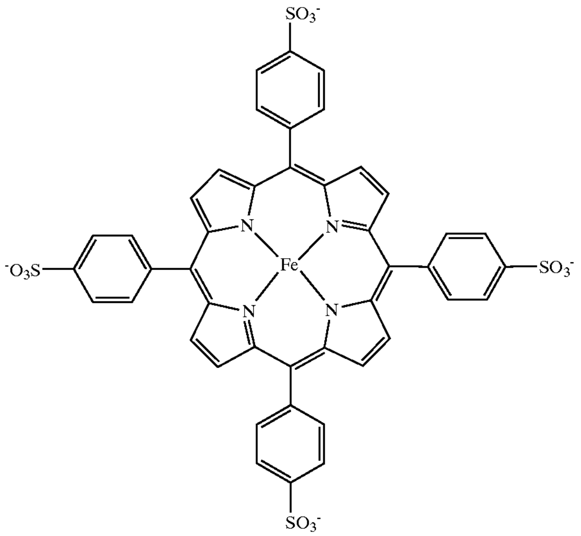

-continued (IV)

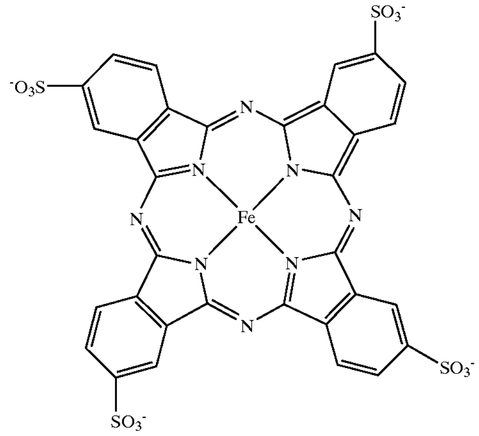

In formula (I), $R^1$ is preferably a substituted or unsubstituted straight-chain alkylene group having 2 to 8 carbon atoms or a substituted or unsubstituted phenylene group, still preferably a phenylene group, particularly preferably an orthophenylene group. $R^2$, $R^3$ and $R^4$ are each preferably a substituted or unsubstituted straight-chain alkylene group having 1 to 8, particularly 1 to 6, especially 1 to 3, carbon atoms. M is preferably Fe. X is preferably an ammonium ion, particularly an ammonium ion having four alkyl groups having 2 to 10 carbon atoms bonded thereto, i.e., a tetraalkylammonium ion. The tetraamide complexes represented by formula (I) can be synthesized by, for example, the process taught in JP-W-12-515152.

Of the tetraamide complexes represented by formula (I), preferred is a tetraamido-Fe complex represented by formula (II):

(II-1)

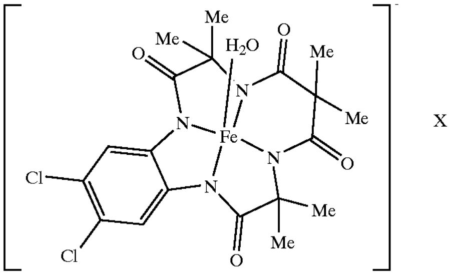

wherein Me stands for a methyl group and X represents a counter ion in equilibrium with the compound's charges on a stoichiometric basis, and particularly preferred is a tetraamido-Fe complex represented by formula (II-I):

(II-I)

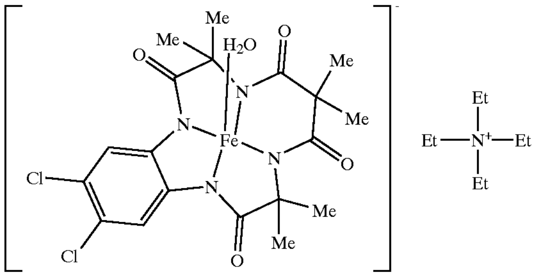

wherein Me stands for a methyl group and Et stands for an ethyl group.

Of the bleaching activators as component (b), preferred are the tetraamido-Fe complex of formula (II-I), the tetra (sulfonatedphenyl) porphyrin Fe complex of formula (III), and the tetrasulfonated phthalocyanine Fe complex of formula (IV). The tetraamido-Fe complex of formula (II-I) and the tetra(sulfonated phenyl) porphyrin Fe complex of formula (III) are still preferred. The tetraamido-Fe complex of formula (II-I) is particularly preferred.

The cationic compound which can be used as component (c) includes amino compound salts and quarternized amino compounds. Suitable examples of such cationic compounds include ammonium salts having the same alkyl groups, such as tetraethylammonium chloride, tetrapropylammonium chloride, and tetrabutylammonium chloride, mono(long-chain alkyl) trimethylammonium salts, such as octyltrimethylammonium chloride, decyltrimethylammonium chloride, and dodecyltrimethylammonium chloride, di(long-chain alkyl)dimethylammonium salts, and tri(long-chain alkyl)monomethylammonium salts; diammonium salts, such as N,N'-hexamethylpropylenediammonium dichloride and N-trimethyl-N'-hexyldimethylpropylenediammonium dichloride; salts of nitrogen-containing heterocyclic compounds (e.g., pyridine, imidazole and pyrazole) or quarternized compounds thereof; and guanidine hydrochloride. Preferred of them are tetraethylammonium chloride, tetrapropylammonium chloride, and tetrabutylammonium chloride.

The bleaching formulation of the invention preferably comprises 0.01 to 99% by weight, particularly 0.01 to 80% by weight, of component (a); 0.0001 to 10% by weight, particularly 0.0001 to 3% by weight, of component (b); and 0.1 to 99% by weight, particularly 0.5 to 90% by weight, of component (c) In order for component (b) to effectively exhibit catalysis to manifest satisfactory bleaching performance, the weight ratio of component (a) to component (b), i.e., (a)/(b) preferably falls within 1 to 100000, particularly 1 to 50000.

The bleaching formulation may be either in powder form or liquid form. The formulation can contain alkalis, surface active agents, sequestering agents, and so forth in addition to the above-mentioned essential components. The alkalis include sodium carbonate and potassium carbonate.

The surface active agents include anionic ones, nonionic ones, cationic ones, and amphoteric ones. Anionic or nonionic surface active agents are preferred. Suitable anionic surface active agents include alkylbenzenesulfonates having 10 to 18 carbon atoms in the alkyl moiety, alkylsulfates having 10 to 18 carbon atoms in the alkyl moiety, and methyl α-sulfo(fatty acid) ester salts having 12 to 18 carbon atoms in the fatty acid moiety. Preferred counter ions are sodium, potassium and ammonium ions, with sodium and potassium ions being still preferred. Suitable nonionic surface active agents include polyoxyalkylene (average alkylene oxide addition mole number: 1 to 20) alkyl or alkenyl (having 10 to 18 carbon atoms) ethers. A preferred surface active agent content in the bleaching formulation is 50% by weight or smaller, particularly 0.5 to 40% by weight.

The sequestering agent includes phosphates, phosphonocarboxylates, and polyacrylates. A preferred sequestering agent content in the bleaching formulation for assuring a bleaching effect is 30% by weight or smaller, particularly 0.1 to 20% by weight.

If desired, the bleaching formulation can further comprise other additives such as re-staining inhibitors, extenders, enzymes, fluorescent brightening agents, dyes, pigments, and perfumes.

The bleaching composition according to the formulation of the invention can be added to powdered or liquid laundry detergents, detergents for rigid surfaces, dishwasher detergents, artificial teeth cleaners, and so on to impart bleaching performance to these detergents or cleaners. The formulation of the invention is also applied to hair bleaching and for industrial applications, for example, wood pulp bleaching.

The method of bleaching an object with the bleaching formulation of the invention include an embodiment in which the object is bleached with a mixture (composition) of components (a), (b) and (c) and an embodiment in which the object is pre-treated with a composition containing at least component (c) but containing no component (a) and then bleached with a composition containing components other than the components used in the pretreatment.

Pretreatment of an object to be bleached with a composition containing component (c) facilitates component (b)'s being adsorbed to the object and enhances the activating action of component (b) on component (a). The pretreatment with component (c) can be carried by (1) pre-treatment with a composition containing component (c) followed by bleaching with a composition containing components (a) and (b), (2) pre-treatment with a composition containing components (b) and (c), followed by bleaching with a composition containing component (a), or (3) pre-treatment with a composition containing component (c), followed by treatment with a composition containing component (b), followed by bleaching with a composition containing component (a).

The bleaching formulation according to the present invention exhibits sufficient bleaching performance at a low temperature of 45° C. or even lower, particularly of 30° C. or even lower.

EXAMPLES

The present invention will now be illustrated in greater detail with reference to Examples. Unless otherwise noted, all the percents are given by weight.

Examples 1 to 8 and Comparative Examples 1 to 5

A piece of tea-stained cotton cloth which was prepared in the manner described below was soaked in 50 ml of a 0.15% aqueous solution of sodium carbonate, which served as an environment of using a bleaching agent. Into the solution were put 1 g of the cationic compound shown below, 0.05 mg of the bleaching activator shown below (final concentration: 1 ppm), 35% hydrogen peroxide (final concentration: 0.04%) and, in some cases, 10 mg of the surface active agent shown below to effect bleaching at 20° C. for 30 minutes. For comparison, the same procedure was conducted, except that no cationic compound was added. After the bleaching treatment, the cloth was rinsed with water and dried. The reflectance (at 460 nm) of the stained cloth was measured before and after the bleaching treatment, and a bleaching ratio (%) was calculated from these reflectances and the reflectance (at 460 nm) of the cotton cloth before being stained according to the following equation. The results obtained are shown in Table 1.

Bleaching ratio (%)=(reflectance after bleaching−reflectance before bleaching)/(reflectance before staining−reflectance before bleaching)×100

Preparation of Tea-Stained Cloth:

Nitto Tea (yellow package, available from Mitsui Norin Co., Ltd.) (80 g) was boiled in 3 liters of ion-exchanged water and strained through destarched and bleached cotton cloth. A piece of cotton cloth was soaked in the filtrate, boiled for 15 minutes, and allowed to stand for 2 hours. The cloth was taken out and dried spontaneously. The cloth thus stained was washed with water repeatedly until the washing had no color, dehydrated, and pressed to obtain a 4 cm by 4 cm piece of tea-stained cloth.

Cationic Compounds:

A: Tetraethylammonium chloride

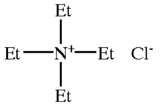

B: N,N′-Hexamethylpropylenediammonium dichloride

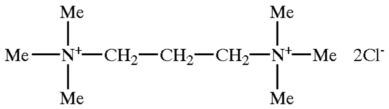

C: Guanidine hydrochloride

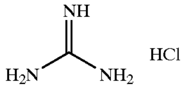

Bleaching Catalysts:

II-I: Tetraamido-Fe-catalyst of formula (II-I) (named Collins Fe complex)

III: Tetra(sulfonated phenyl)porphyrin Fe complex of formula (III)

Surface Active Agents:

TABLE 1

| | Example | | | | | | | | Comparative Example | | | | |
|---|---|---|---|---|---|---|---|---|---|---|---|---|---|
| | 1 | 2 | 3 | 4 | 5 | 6 | 7 | 8 | 1 | 2 | 3 | 4 | 5 |
| Cationic Compound | A | A | A | A | A | B | B | C | — | — | — | — | — |
| Bleaching Catalyst | II-I | II-I | II-I | III | III | II-I | II-I | II-I | II-I | II-I | II-I | III | — |
| Surfactant | — | S-1 | S-2 | — | S-2 | — | S-2 | — | — | S-1 | S-2 | — | — |
| Bleaching Ratio (%) | 36 | 37 | 36 | 34 | 35 | 28 | 29 | 35 | 10 | 10 | 9 | 10 | 8 |

S-1: Sodium alkyl ($C_{12}$) benzenesulfonate
S-2: Polyoxyethylene (EO = 8) lauryl ether Examples 9 and 10

One gram of the cationic compound shown in Table 2 below was added to 50 ml of a 0.05% aqueous solution of sodium carbonate, and a piece of the same tea-stained cloth (4 cm×4 cm) as prepared in Example 1 was soaked therein for 10 minutes (pretreatment) To the solution were added 0.05 mg of the bleaching activator shown in Table 2 (final concentration: 1 ppm) and 35% hydrogen peroxide (final concentration: 0.04%) to conduct bleaching at 20° C. for 30 minutes. The cloth thus bleached was rinsed and dried, and the bleaching ratio was obtained in the same manner as in Example 1. The results obtained are shown in Table 2. The cationic compound A and bleaching catalysts II-I and III shown in Table 2 are the same as used in Examples 1 to 5.

TABLE 2

| | Example | |
|---|---|---|
| | 9 | 10 |
| Cationic Compound | A | A |
| Bleaching Catalyst | II-I | III |
| Bleaching Ratio (%) | 38 | 36 |

It can be seen from the results in Tables 1 and 2 that the formulations containing a cationic compound achieve significantly improved bleaching ratios.

The entire disclosure of each and every foreign patent application from which the benefit of foreign priority has been claimed in the present application is incorporated herein by reference, as if fully set forth herein.

What is claimed is:

1. A bleaching formulation comprising the components of:

(a) a peroxy bleaching agent selected from the group consisting of hydrogen peroxide, organic peroxide and an organic peracid, wherein the organic peroxide and the organic peracid are capable of generating hydrogen peroxide in an aqueous solution;

(b) an anionic bleaching activator comprising a metal; and (c) a cationic compound that is an amino compound salt or a quaternized amino compound salt; with the proviso that component (b) is a complex selected from the group consisting of formulae (I), (III) and (IV):

(I)

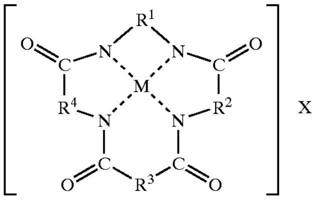

-continued (III)

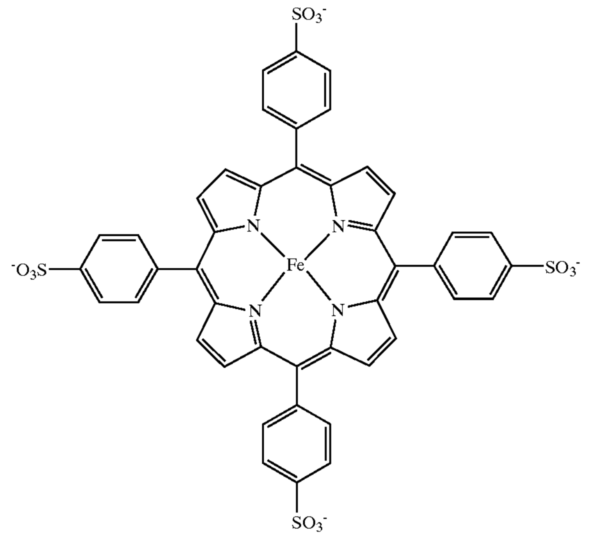

(IV)

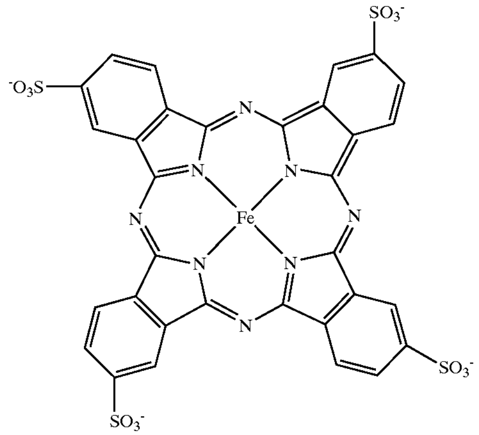

wherein $R^1$ represents one of a straight-chain alkylene or alkenylene group having 2 to 8 carbon atoms, a cycloalkylene or cycloalkenylene group having 3 to 8 carbon atoms or a phenylene group; $R^2$, $R^3$ and $R^4$ each independently represent one of a methylene group, a straight-chain alkylene or alkenylene group having 2 to 8 carbon atoms, a cycloalkylene or cycloalkenylene group having 3 to 8 carbon atoms or a phenylene group; $R^1$, $R^2$, $R^3$ and $R^4$ may each have a substituent(s) which is an alkyl, alkenyl, alkynyl, alkoxy or halogenated alkyl group having up to 8 carbon atoms, a cycloalkyl or cycloalkenyl group having 3 to 8 carbon atoms, an aryl group, an aryl group having a straight-chain alkyl group having 1 to 18 carbon atoms, a hydroxyl group, a phenoxy group, a halogen atom, an amino group, a sulfuric acid radical, a sulfo group, a nitro group, or a carboxyl group; M represents a metal which is a transition metal having a I, II, III, IV, V, VI, VII or VIII-valent oxidized state; and X represents a counter ion in equilibrium with the compound's charges on a stoichiometric basis.

2. The bleaching formulation according to claim 1, wherein the component (a) to one of sodium percarbonate, sodium perborate monohydrate and sodium perborate tetrahydrate.

3. The bleaching formulation according to claim 1, wherein the component (b) in a complex represented by the following formula (II):

(II)

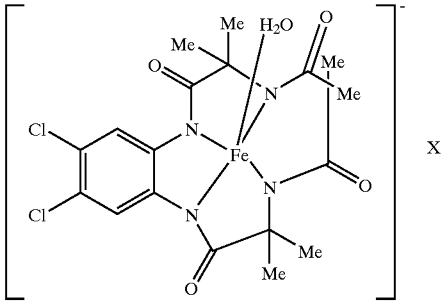

Me = $CH_3$ wherein Me represents a methyl group and x represents a counter ion in equilibrium with the compound's charges on a stoichiometric basis.

4. The bleaching formulation according to claim 1, wherein the component (b) is a complex represented by the following formula (II-I):

(II-1)

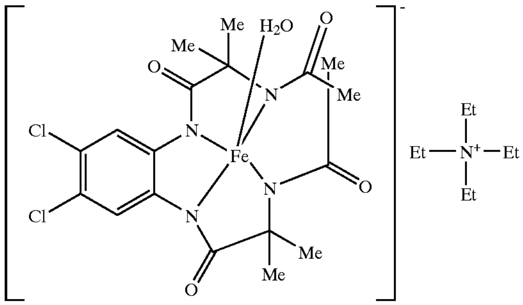

wherein Me represents a methyl group and Et represents a ethyl group.

5. The bleaching formulation according to claim 1, which comprises from 0.01 to 99% by weight of the component (a), from 0.0001 to 10% by weight of the component (b), and from 0.1 to 99% by weight of the component (c), the weight ratio of the component (a) to the component (b) being from 1:1to 100000:1.

6. The bleaching formulation according to claim 1, which further comprises at least one of an alkali, 50% by weight or less of a surface active agent, and 30% by weight or less of a sequestering agent.

7. A method comprising bleaching with the bleaching formulation according to claim 1, wherein the method is carried out by one of three processes of:

(i) bleaching with a mixture of the components (a), (b) and (c);

(ii) pre-treament with a composition comprising the component (c) and bleaching with a composition comprising components (a) and (b) after the pre-treament; and (iii) pre-treament with a composition comprising the components (b) and (c) and bleached with a composition comprising the components (a) after the pre-treament.

* * * * *